United States Patent [19]

Plumly

[11] 4,435,743
[45] Mar. 6, 1984

[54] EDGE LIGHTED SIGN

[76] Inventor: George W. Plumly, 1601 Dakar Rd. W., Fort Worth, Tex. 76116

[21] Appl. No.: 275,613

[22] Filed: Jun. 22, 1981

[51] Int. Cl.$^3$ ............................................. F21V 19/04
[52] U.S. Cl. ...................... 362/20; 362/31;
 362/184; 362/190; 362/200; 362/208; 362/227;
 362/249; 362/251; 362/252; 362/276; 362/375;
 362/802; 362/806; 362/812; 40/574
[58] Field of Search ...................... 40/574; 362/20, 31,
 362/184, 190, 200, 208, 227, 249, 251, 252, 276,
 375, 802, 806, 812

[56] References Cited
U.S. PATENT DOCUMENTS

| | | | |
|---|---|---|---|
| 2,994,148 | 8/1961 | Endelson | 362/31 X |
| 4,201,005 | 5/1980 | Hunt | 362/812 X |
| 4,272,901 | 6/1981 | Matthews | 40/574 |

Primary Examiner—Stephen J. Lechert, Jr.
Attorney, Agent, or Firm—Wm. T. Wofford; James C. Fails; Arthur F. Zobal

[57] ABSTRACT

A lighted exit sign comprising a light transmitting plate having a viewing side and upper and lower edges onto which light can be projected for transmission into the plate for viewing from the viewing side. Upper and lower printed circuit boards are supported close to the upper and lower edges of the plate. A plurality of small incandescent light bulbs are secured to the upper and lower circuit boards for producing light when energized for projection onto the upper and lower edges for transmission into the plate for viewing from the viewing side. A white, light reflecting layer is formed on the side of the plate opposite the viewing side. The letters EXIT are formed on the viewing side in two layers. The first layer is white in color and is secured directly to the viewing side. The second layer is preferably red in color and is secured to the first layer. A transformer is employed for converting an A C voltage to a level below the rated voltage of the bulbs and to a level above the rated voltage of the bulbs. The A C voltage below the rated voltage of the bulbs is employed for normally energizing said bulbs. The A C voltage above the rated voltage of the bulbs is rectified and applied to maintain batteries charged. In the event that the A C power fails, a switching system connects the batteries to the bulbs to energize them with a voltage greater than their rated voltage.

39 Claims, 17 Drawing Figures

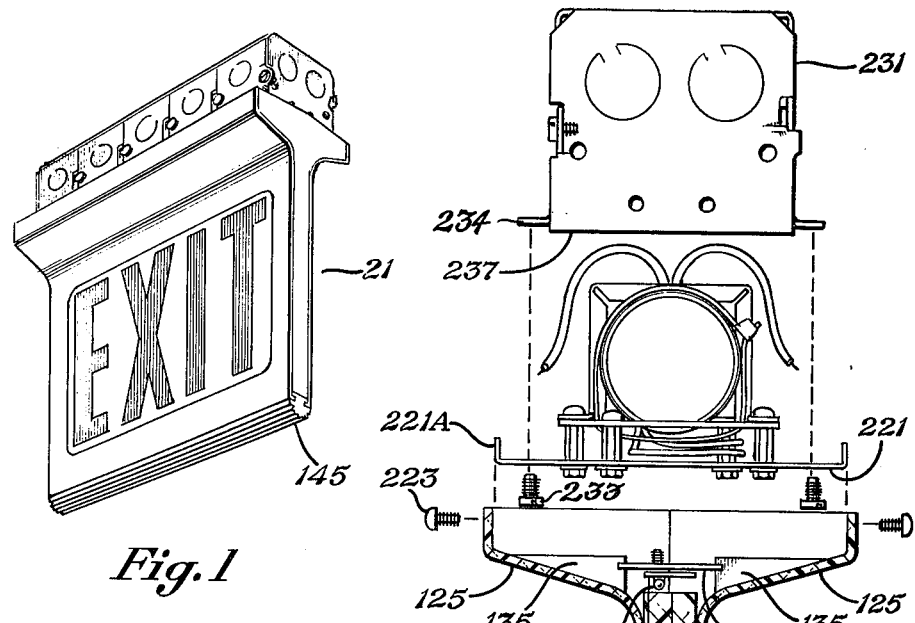
Fig.1
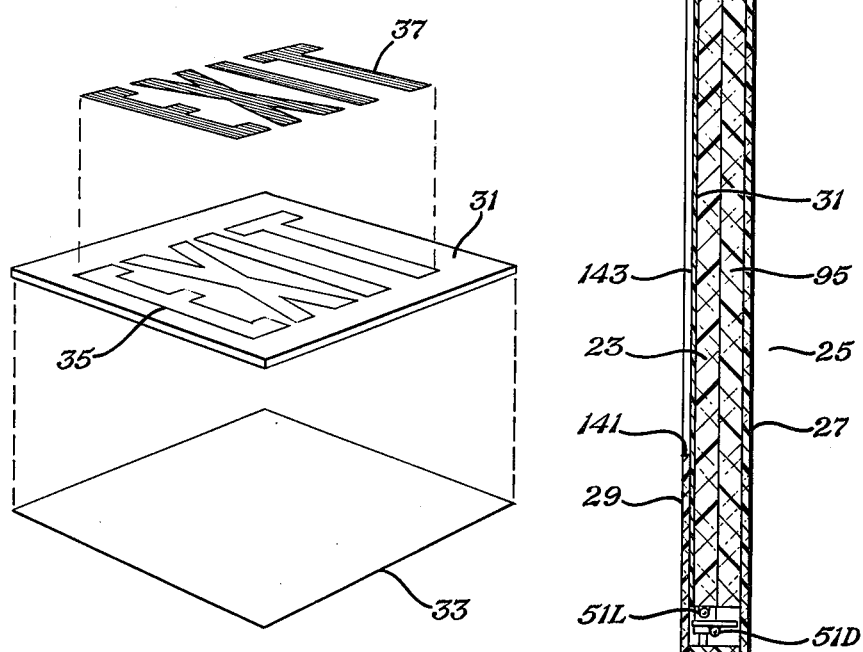
Fig.11
Fig.3

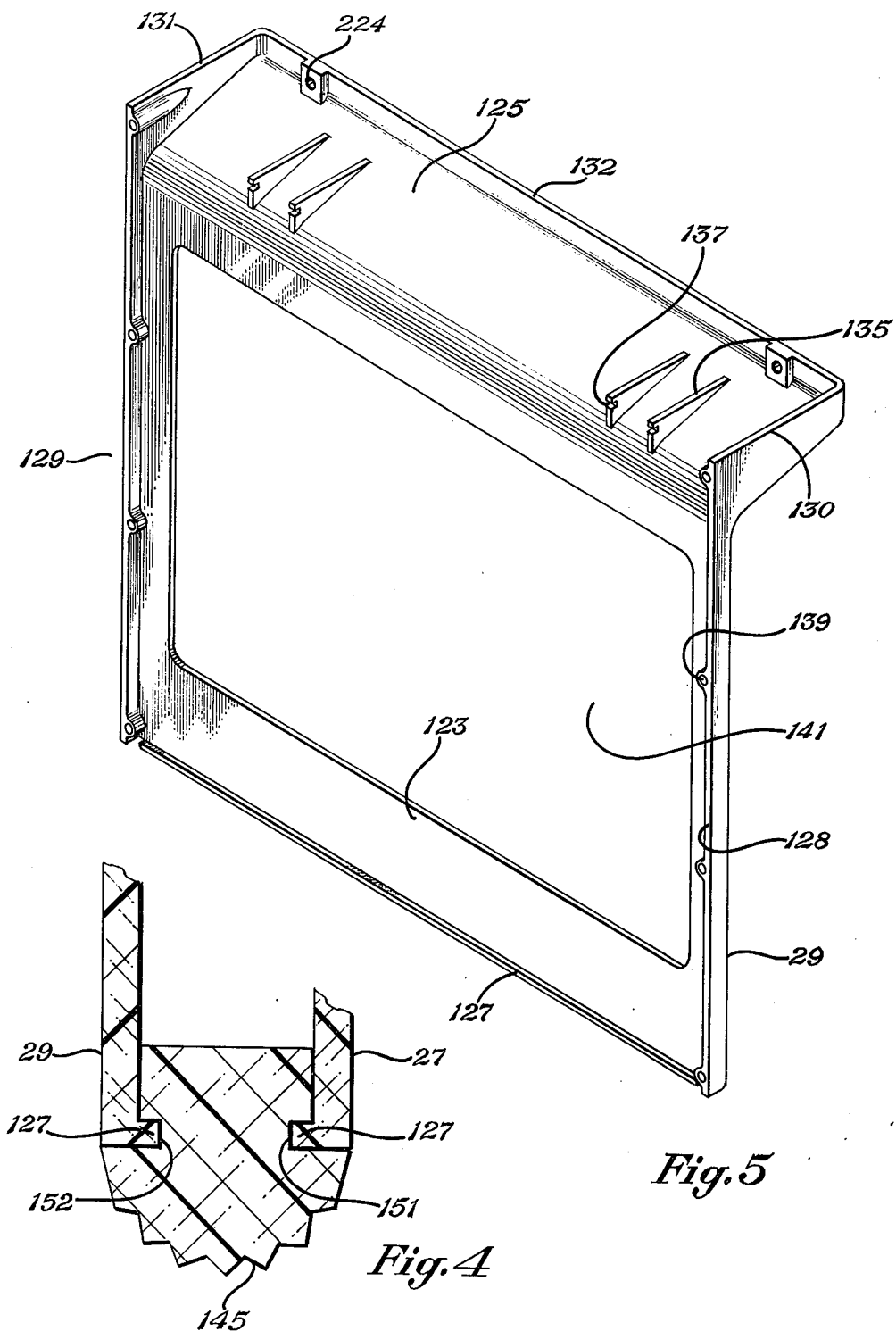

EDGE LIGHTED SIGN

BACKGROUND OF THE INVENTION

1. Field of the Invention

The present invention relates to an edge lighted plate for use as an exit sign or for other purposes.

2. Description of the Prior Art

Many cities require buildings to have a standby source of power for lighted exit signs in the event that the conventional AC power fails. Rather than employing a generator and extra wiring for the signs, it it cheaper and more convenient to use batteries for each sign as the backup system. Most emergency exit signs use two 20 watt and two 7 watt incandescent light bulbs located in a box employing lenses which form the sign. The two 20 watt bulbs are powered by 110 volts AC to maintain these bulbs normally on. The two 7 watt bulbs are normally off. In the event that the AC power fails and the 20 watt bulbs go off, the two 7 watt bulbs are turned on. They are powered by 6 volts DC from three 2 volt batteries. A transformer is employed for reducing the 110 volts AC to 6 volts AC which is rectified and applied to the batteries for maintaining the batteries charged. Regulations require the batteries to be able to maintain the emergency bulbs on for 1½ hours. Signs of this type have disadvantages in that in the event of an emergency, such as a fire, which causes the 20 watt bulbs to go off and the 7 watt bulbs to turn on, the amount of light produced by the 7 watt bulbs is at such a low level that in a smoke filled room, the sign cannot be seen. Moreover, the 20 watt bulbs burn a relatively large amount of energy and hence generate a large amount of heat in their confined space. This reduces their lifetime to a period of about 1 year requiring frequent replacement. In addition, the total package of these prior exit signs including their batteries is relatively large.

SUMMARY OF THE INVENTION

It is an object of the present invention to provide a panel and an electrical system useful for a lighted exit sign which avoids the above disadvantages. The panel comprises a light transmitting plate having a viewing side and an edge onto which light can be projected for transmission into said plate for viewing from said viewing side. A plurality of small incandescent light bulbs are located close to said edge of said plate along its length at spaced apart positions for producing light when energized, for projection onto said edge of said plate for transmission into said plate for viewing from said viewing side. Each of said bulbs are rated at a given voltage level. Power means is provided for normally applying an operating voltage to said plurality of small incandescent light bulbs at a voltage level less than said given voltage level for normally energizing said bulbs at said operating voltage level less than said given voltage level thereby increasing the lifetime of said bulbs over that obtainable if said bulbs were normally energized at said given voltage level. Emergency power means is provided for applying an emergency voltage to said plurality of small incandescent light bulbs in the event that said operating voltage fails. The emergency voltage is at a level greater than said given voltage level thereby increasing the brightness of the bulbs in the event of an emergency. In the embodiment disclosed, the operating voltage is an AC voltage and the emergency voltage is a DC voltage. In the preferred embodiment, the same bulbs are employed for normal and for emergency use, however, one set of bulbs may be employed for normal use and another set of bulbs may be employed for emergency use.

The circuitry for operating the bulbs for normal and emergency purposes comprises a transformer for converting an AC voltage to a level above the rated voltage of said bulbs and to a level below said rated voltage of said bulbs. The AC voltage below the rated voltage of said bulbs is employed for normally energizing said bulbs. The bulbs are energized during an emergency by batteries which apply a DC voltage to the bulbs at a level above said rated voltage of said bulbs. The AC voltage above said rated voltage of said bulbs is rectified and applied to maintain the batteries charged. With such a system, the packaging of the electrical system may be made small whereby it may fit into ganged conventional switch boxes.

In a further aspect, a thin elongated circuit board is located close to and extends along said edge of said plate. The thin elongated circuit board comprises a thin elongated electrically non-conducting member having at least two generally flat electrical leads secured to said thin elongated member at spaced apart positions along its length on one side thereof with a plurality of spaced apart apertures formed through each of said leads and through said member. Said plurality of small incandescent light bulbs each has two electrical leads extending therefrom. The two leads of each of said bulbs extend through two apertures formed through said generally flat leads respectively and are electrically secured to said two generally flat leads.

In another aspect of the present invention, said circuit board and the normal and emergency power system also are employed for supporting and operating a plurality of miniature incandescent light bulbs for downlighting purposes.

In still a further aspect of the present invention, a white, light reflecting layer is formed on the side of said plate opposite said viewing side. The letters EXIT are formed on said viewing side in first and second layers. The first layer is white in color and is secured directly to said viewing side. The second layer has a color different from white and is secured to said first layer.

BRIEF DESCRIPTION OF THE DRAWINGS

FIG. 1 is a perspective view of the lighted exit sign of the present invention.

FIG. 3 is a cross-sectional view of the frame and lens of the exit sign of FIG. 1 with the circuitry components and the housing shown in exploded positions.

FIG. 4 is an enlarged cross-sectional view of the lower portion of FIG. 3.

FIG. 5 illustrates one side of the frame of the exit sign of FIG. 1.

FIG. 11 illustrates a light reflecting layer and the words EXIT formed on opposite sides of the lens of FIG. 6.

DETAILED DESCRIPTION OF THE PREFERRED EMBODIMENTS

Figure 2:
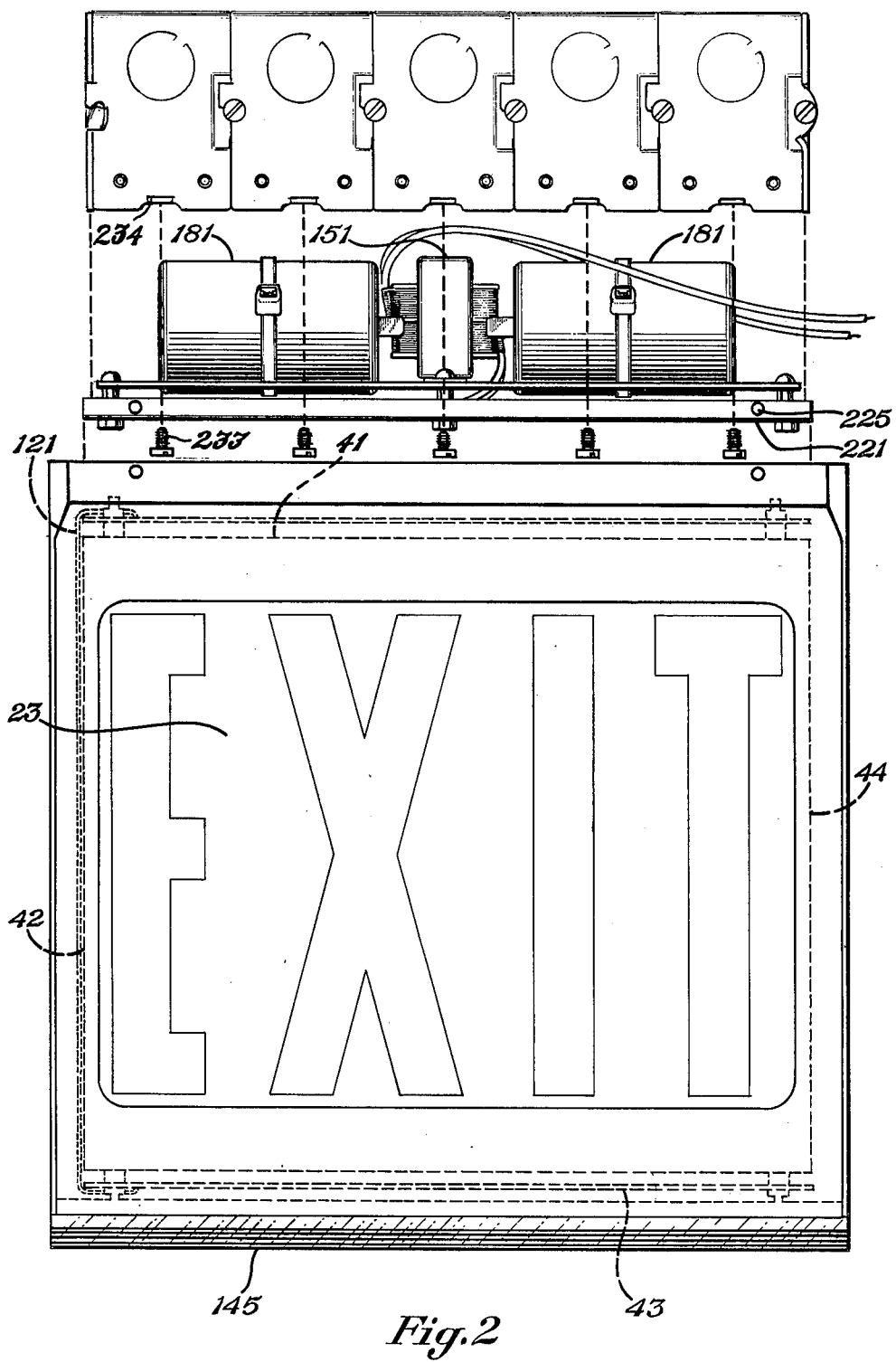
FIG. 2 is a side view of the exit sign of FIG. 1 partially exploded.

Referring now to FIGS. 1-6 of the drawings the lighted exit sign is identified by reference numeral 21. It is of the type that is secured to the ceiling of a room, hall, etc. The exit sign comprises a transparent or light transmitting lens 23 supported in a frame 25 formed by two half frame members 27 and 29. The lens 23 is a rectangular shaped plate formed of acrylic plastic although it could be formed of polycarbonate, styrene, glass or other clear material. The lens 23 has the word EXIT formed on its viewing side 31 and a translucent light reflecting layer 33 formed on its back side. Layer 33 is of white paint which is silk screened on the back side of the lens 23. The letters of the word EXIT are formed in two layers 35 and 37. The first layer 35 of the letters is white paint which is silk screened on the viewing side 31 of the lens 23. The second layer 37 of the letters is red paint which is silk screened on the first layer 35 of the letters. The two letter layers 35 and 37 together form opaque letters.

The lens 23 has top and bottom edges 41 and 43 onto which light can be projected for transmission into the lens for viewing from the viewing side 31. Since the white layer 33 is in optical contact with the back side of the lens, a certain amount of reflection and refraction takes place which lights up the white layer 33, thereby making the word EXIT stand out in red against a lighted white background. The purpose of the white letter layer 35 is to prevent the background light from being pink which would otherwise occur if the white letter layer 35 where not employed and the red letter layer 37 applied directly to the viewing side 31 of the lens 23.

Although layer 37 preferably is red, it is to be understood that it could be green or any other appropriate color.

Figure 6:
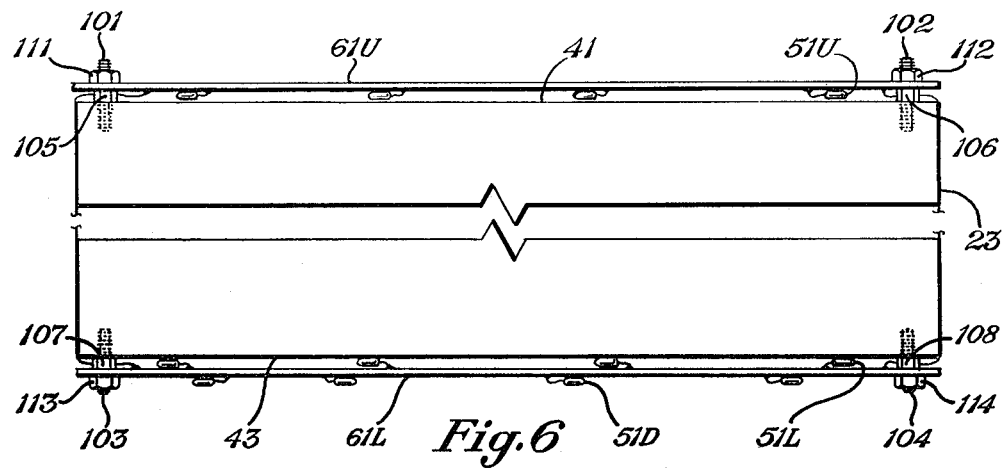
FIG. 6 is a partial side view of the lens used in the sign of the present invention.
Figure 7:
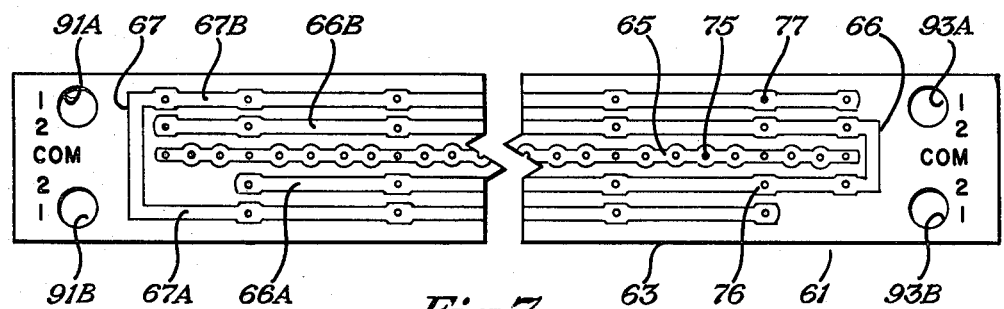
FIG. 7 is a partial plan view of a printed circuit board used in the sign of the present invention.
Figure 8:
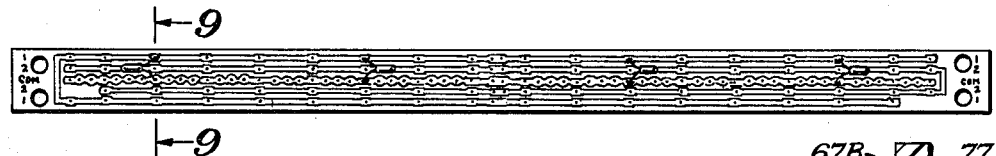
FIG. 8 is a plan view of the printed circuit board of FIG. 7 showing small incandescent light bulbs connected thereto.

A plurality of miniature incandescent light bulbs 51 are located at spaced apart positions next to the edges 41 and 43 for projecting light into the lens 23. A plurality of the bulbs 51 also are located at spaced apart positions below the lens 23 for projecting light downward for downlighting purposes. Each of the bulbs 51 is identical. In FIG. 6, the upper bulbs next to the edge 41 are designated as 51U; the lower bulbs next to the edge 43 are designated as 51L; and the down lighting bulbs are designated as 51D.

Two identical upper and lower printed circuit boards 61 are provided for supporting the bulbs 51. In FIG. 6, the upper circuit board is designated as 61U and the lower circuit board is designated as 61L. Referring to FIGS. 7-10, each of the circuit boards 61 comprises a thin, flat, elongated member 63 formed of electrically non-conducting material such as fiberglass. Three flat electrical leads 65-67 are formed of metal on one side of member 63 at spaced apart positions by an etching process. Lead 65 is a central straight elongated lead. It is designated as a common lead. Lead 66 is U-shaped and has two elongated legs 66A and 66B located on opposite sides of lead 65. Lead 67 also is U-shaped and has two elongated legs 67A and 67B with leads 65 and 66 located between legs 67A and 67B. A plurality of small apertures 75, 76, and 77 are formed through leads 65, 66, and 67 respectively and through member 63. Adjacent apertures 75 are formed close together. Adjacent apertures 76 are formed further apart at predetermined intervals as are adjacent apertures 77. At these intervals, apertures 76 and 77 are in alignment with each other and with one of the apertures 75 forming a row of apertures perpendicular to the length of the member 63. The purpose of the plurality of apertures 75, 76, and 77 is to allow the bulbs 51 to be connected to a pair of the leads 65, 66, or 65, 67 from either or both sides of the board 61 at a number of positions along the length of the board.

Figure 10:
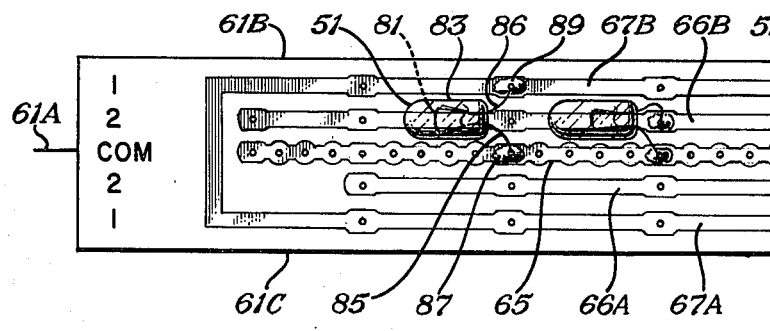
FIG. 10 is an enlarged plan view of a portion of the printed circuit board of FIGS. 7 and 8 with small incandescent light bulbs connected thereto.
Figure 9:
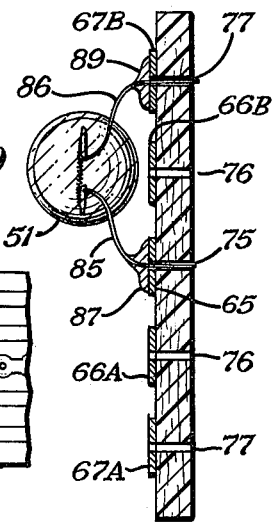
FIG. 9 is an enlarged cross-sectional view of FIG. 8 taken along the lines 9—9 thereof.

As seen in FIGS. 9 and 10, each bulb 51 comprises a filament 81, enclosed in a glass housing 83 having two thin electrical leads 85 and 86 extending therefrom. A bulb 51 may be electrically connected, for example, to lead pairs 65 and 67 by inserting the leads 85 and 86 through apertures 75 and 77 and soldering the leads 85 and 86 to the leads 65 and 67 as shown in FIG. 9. The solder connections are shown at 87 and 89 respectively. The leads 85 and 86 may be inserted through apertures 75, 76 or 75, 77 from either side of the circuit board 61 whereby the bulb 51 may be located on either side of the board 61.

The member 63 has two large apertures 91A, 91B and 93A, 93B formed through opposite ends for allowing the boards 61 to be connected to the top and bottom edges 41 and 43 of the lens 23. As seen in FIG. 6, threaded members 101, 102 and 103, 104 are embedded in opposite ends of the top and bottom edges 41 and 43 of the lens 23. Nuts 105, 106 and 107, 108 are threaded to members 101, 102 and 103, 104, respectively and serve as spacers for providing space between the boards 61 and the edges of the lens for the bulbs 51. The boards 61U and 61L are connected to threaded members 101, 102 and 103, 104 by inserting the threaded members 101, 102 and 103, 104 in either of apertures 91A, 93A, or 91B, 93B and then securing nuts 111, 112 and 113, 114 to threaded members 101, 102 and 103, 104. As seen in FIG. 3, the width of the member 63 is twice the thickness of the lens plate 23. In FIG. 3, member 95 is only a filler plate employed to fill the space between lens 23 and the frame half 27. If apertures 91A, 93B are employed for connecting a board 61 to the top or bottom edge of the lens, lead legs 67B and 66B will be located in alignment with the edge of the lens and the other lead legs 67A and 66A will be off to the side of the edge of the lens. In this case, the bulbs 51 will be connected to either lead legs 67B or 66B and to the common lead 65 and located between the center line 61A of the board and its edge 61B such that the bulbs will be in line with the edge of the lens. Preferably, the main bulbs will be connected to the outer lead leg 67B and to common lead 65.

The upper board 61U will be mounted close to the upper edge 41 such that the leads 65, 66, and 67 face upward. Four bulbs 51U will be located on the other side of the board between the board and the top edge 41. The lower board 61L will be mounted close to the lower edge 43 such that the leads 65, 66, and 67 face downward. Four bulbs 51L and four bulbs 51D will be located on opposite sides of the board 61L. Prior to assembling the boards to the lens, the bulbs 51 will be located on the proper side or sides of the boards and connected to the proper leads 65, 66, 67. The boards then will be mounted in place and the leads 65, 66, and 67 of the upper and lower boards 61U and 61L will be connected together by three leads, respectively. One such lead is illustrated at 121 in FIG. 2.

Referring to FIG. 5, frame half 29 is L-shaped and comprises a large flat wall 123, a transverse wall 125, and edge walls 127, 128, 129, 130, 131, and 132. Retainer supporting members 135 having notches 137 are formed on the inside of transverse wall 125. Apertures 139 are formed in edge walls 128 and 129. A large window 141 is formed through wall 123. The frame half 29 is opaque and white in color. It is formed of a suitable plastic. The frame half 27 is identical to the frame half 29 except that it does not have a window 141 and it has pins extending from its edge walls 128 and 129 which mate with apertures 139 of edge walls 128 and 129 of frame half 29 when the two frame halves are brought together.

After the bulbs 51 have been secured to the circuit boards 61 and the circuit boards mounted to the upper and lower edges 41 and 43 of the lens 23 with their leads connected together, the frame halves 27 and 29 are assembled together with the lens 23 and filler 95 located therebetween as shown if FIG. 3. The filler 95 may be formed of white corregated cardboard and is held in place by a press fit. The word EXIT will face outward through the window 141 and a thin transparent plastic sheet 143 will be located over the viewing side 31 of the lens 23 for protection purposes. The two frame halves 27 and 29 are assembled together by inserting the pins of frame half 27 into the mating apertures 139 of frame half 29 with a suitable glue applied to the edge walls 128 and 129 of the frame halves 27 and 29. In addition, a lower elongated transparent lens 145 will be mounted to the lower end of the frame halves and a retainer slat 147 mounted to the upper end of the frame halves. The lower lens 145 has two slots 151 and 152 into which the edge walls 127 of the frame halves 27 and 29 are fitted and glued. The lower lens 145 is formed of a suitable plastic. The retainer slat 147 is fitted and glued in the slots 137 of retainer supporting members 135 of frame halves 27 and 29. The lower threaded members 103 and 104 and their nuts 113 and 114 will rest on the top of the lower lens 145 maintaining the down lighting bulbs 51D spaced from the top of the lower lens 145. The purpose of the retainer slat 147 is to prevent the lens 23 from falling out of the frame in the event it is accidently turned upside down during handling or installation.

Assuming that the bulbs 51U, 51L, and 51D are electrically connected to lead legs 67B and to leads 65 of the circuit boards, the bulbs are energized by applying an electric current to lead legs 67B and to leads 65 of the circuit boards. This causes the bulbs to be lit with bulbs 51U and 51L projecting light into the lens for making the word EXIT stand out against a lighted white background. The bulbs 51D project light downward through lens 145 for downlighting purposes.

An extra set of bulbs 51U, 51L and 51D may be connected to lead legs 66B and to leads 65 and located on the same sides of the circuit boards 61 as are the main bulbs which are connected to lead legs 67B and to leads 65. One such bulb is illustrated on the right in FIG. 10. For each circuit board, if the main bulbs are connected to lead leg 67B and to lead 65 and are located between the center line 61A of the board and its edge 61B, the extra set of bulbs will be connected to lead leg 66B and to lead 65 and will be located between the center line 61A of the board and its edge 61B. The extra set of bulbs provide backup for the main set of bulbs when the main set of bulbs burn out. When this occurs, electric current will be applied to lead 66B and to lead 65 to energize the extra set of bulbs. This extends the lifetime of the lighted exit sign before it is required to take the sign down to change bulbs.

In some cases, it may be desirable to employ two lenses 23 in the frame 25. In this embodiment, the frame half 27 will have a window 141 formed through its wall 123 and the second lens will be located in place of filler 95 with its word EXIT facing outward through the window. A single circuit board will be connected to the top edges of both lenses and a single circuit board will be connected to the lower edges of both lenses. Thus the two lenses will share two circuit boards. Connection of the two circuit boards to the two lenses will be by way of threaded members 101–104, nuts 105–108 and nuts 111–114 of both lenses and apertures 91A, 91B, 93A, 93B of the circuit boards. If the main bulbs 51U, 51L, and 51D of the first lens are connected to lead legs 67B and to common leads 65 of the circuit boards, the main bulbs 51U, 51L and 51D of the second lens will be connected to lead legs 67A and to common leads 65 of the circuit boards. The main bulbs of the first lens will be located between the center line 61A of each circuit board and its edge 61B such that they wil be in alignment with the edges of the first lens. The main bulbs of the second lens will be located between the center line 61A of each circuit board and its edge 61C such that they will be in alignment with the edges of the second lens. In addition, if the extra set of bulbs 51U, 51L, and 51D of the first lens are connected to lead legs 66B and to common leads 65 of the circuit boards, the extra set of bulbs 51U, 51L, and 51D of the second lens will be connected to lead legs 66A and to common leads 65 of the circuit boards. The extra set of bulbs of the first lens will be located between the center line 61A of each circuit board and its edge 61B such that they will be in alignment with the edges of the first lens. The extra set of bulbs of the second lens will be located between the center line 61A of each circuit board and its edge 61C such that they will be in alignment with the edges of the second lens.

In one embodiment, the lens 23 has a length of $9\frac{1}{4}$ inches, a width of about $7\frac{3}{4}$ inches and a thickness of $\frac{1}{4}$ of an inch. The letters of the word EXIT are 6 inches high and have stroke widths of $\frac{3}{4}$ of an inch. The bulbs 51 are about $\frac{1}{8}$ of an inch long and about 1/16 of an inch in diameter. They are rated at 3 volts. They are identified as CM8845 and are available commercially from Chicago Miniature Lamp Works, Chicago, Ill. At three volts, they have a life design period of 16,000 hours. The circuit boards 61 have a length of $9\frac{1}{4}$ inches, a width of about 9/16 of an inch and a thickness of about 1/16 of an inch. Although four bulbs 51U, four bulbs 51L and four bulbs 51D are disclosed as being employed, a different number of bulbs for each of the sets of bulbs 51U, 51L and 51D may be used.

The lighted exit sign employing the lens 23, the circuit boards 61 and the miniature bulbs 51 has many advantages. The boards 61 with their leads 65, 66, and 67 allow the bulbs to be readily mounted in place at different positions along the length of the boards and on either or both sides thereby facilitating mounting of the bulbs in the proper positions with respect to the edge of the lens. The circuit boards also allow the use of downlighting bulbs; the use of extra bulbs to extend the lifetime of the sign before changing of the bulbs is required; and in addition the use of two lenses which share a common set of circuit boards. The miniature bulbs allow a very thin lens to be used thereby reducing the total size of the sign. In addition they generate very little heat, thereby requiring very little energy for operation and have a long lifetime. Since the bulbs are located at spaced apart positions along the edges of the lens, the light is more evenly distributed in the lens and concentrated heat build up is prevented.

In accordance with another aspect of the present invention, the bulbs are operated during normal periods to extend their lifetime significantly over their rated lifetime and during emergency periods to increase their brightness significantly over their normal brightness. In this respect it can be shown that the lifetime in hours of an incandescent bulb can be expressed by the following relationship:

$$\left(\frac{V}{V1}\right)^{12} \times \text{(life design hours)}$$

wherein: the life design hours is the rated lifetime at the rated voltage V and V1 is a voltage different than the rated voltage. In accordance with the present invention, the bulbs are operated during normal periods at a voltage less than their rated voltage and during emergency periods at a voltage greater than their rated voltage. During normal periods the bulbs are operated at 2.5 volts. For bulbs with a rated voltage of 3 volts and life design hours of 16,000 hours, operation of the bulbs at 2.5 volts will increase their lifetime to about 151,200 hours which is greater than 17 years. During emergency periods, the bulbs are operated at 4 volts. This significantly increases the light they produce although it decreases their lifetime to 432 hours if they were operated at all times at 4 volts. The time the bulbs are expected to be used per year for emergency and for emergency test purposes, however, is about 6 hours. The total time the bulbs are expected to be used over their lifetime for emergency and for emergency test purposes is about 60 hours. Burning the bulbs at 4 volts depletes them 350 times as fast as burning them at 2.5 volts. Thus for the 60 hour period at which they are expected to be operated at 4 volts, the amount of depletion is equivalent to 21,000 hours when operated at 2.5 volts. Subtracting 21,000 hours from 151,200 hours leaves an expected lifetime of 130,200 hours which is greater than 14 years.

Figure 12:
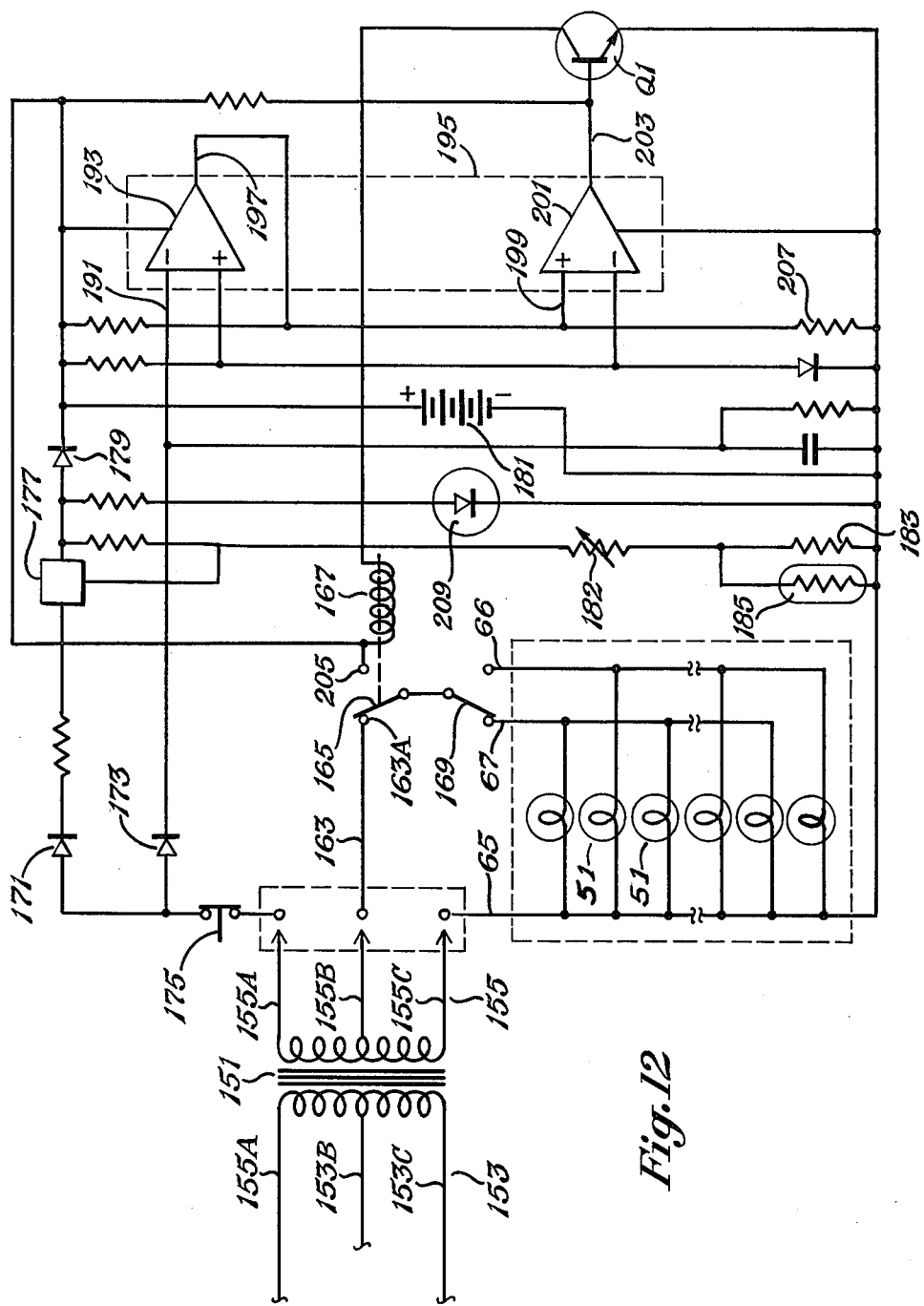
FIG. 12 is an electrical schematic of the power system for powering the bulbs of the sign of the present invention.

Referring now to FIG. 12, there will be described the circuitry for operating the bulbs 51 during normal and emergency periods. The circuitry comprises a transformer 151 having a primary 153 and a secondary 155. 5 volts AC is obtained from leads 155A and 155B of the secondary and 2.8 volts AC is obtained from leads 155B and 155C of the secondary. 277 volts AC may be applied to leads 153A and 153C of the primary or 115 volts AC may be applied to leads 153B and 153C of the primary to obtain the 5 volts AC and 2.8 volts AC at the secondary. The 2.8 volts AC is applied to energize the main bulbs 51 shown connected to leads 65 and 67 during normal operations of the lighted exit sign. Although only 3 of these bulbs 51 are shown, it is to be understood that the same number of bulbs will be employed as are employed in the lighted exit sign for producing light for transmission into the lens of the sign and for downlighting purposes. The bulbs 51 shown connected to leads 65 and 66 are the extra bulbs which will be switched in when the main bulbs burn out. As shown, lead 155C is connected directly to lead 65 and lead 155B is connectable to lead 67 by way of lead 163, switch 165 of relay coil 167, and switch 169. Switch 165 normally engages terminal 163A. By moving the switch 169 to contact lead 66, the extra bulbs may be energized. Although only two extra bulbs 51 are shown, it is to be understood that the number of extra bulbs will correspond to the number of extra bulbs employed for producing light for transmission into the lens and for downlighting purposes. Due to the resistance of the leads, the amount of AC voltage actually applied to the main bulbs or to the extra set of bulbs will be about 2.5 volts AC.

Five volts AC is applied to diodes 171 and 173 by way of normally closed switch 175. Diode 171 rectifies the 5 volts AC to 5 volts DC and applies it to a voltage regulator 177, the output of which then is applied by way of diode 179 to charge the batteries 181 and to maintain them charged. Potentiometer 182 and resistors 183 and 185 adjust the voltage depending upon the temperature in order to obtain the proper voltage for charging the batteries 181. These batteries are two 2 volt sealed lead acid batteries produced by Gates Energy Products, Inc. of Denver, Colo. Each battery has a diameter of about 1¾ inches and a length of 2¾ inches. They are connected to produce 4 volts DC for energizing the bulbs during an emergency period. The output of diode 173 is applied to pin 191 of an operational amplifier 193 of an integrated circuit 195. Integrated circuit 195 is an LM393 circuit commercially available from National Semiconductor of Santa Clara, Calif. The operational amplifier 193 senses by way of pin 191, when AC power is lost. When this occurs it produces an output on pin 197 which is fed to pin 199 of operational amplifier 201 of the intergrated circuit 195. This causes operational amplifier 201 to produce an output which is applied by way of lead 203 to turn on transistor Q1 if the AC power goes off. Transistor Q1 normally is off. When transistor Q1 turns on, current flows through relay coil 167 which moves the switch 165 to contact terminal 205 to allow the batteries 181 to energize the bulbs 51. When the voltage on the batteries drops to a present level as sensed by pin 199 of operational amplifier 201, the transistor Q1 is turned off. This de-energizes relay coil 167 and allows the switch 165 to move away from terminal 205 (and to return to terminal 163A) in order to prevent the batteries 181 from discharging too much to prevent too much loss of life from the batteries. The preset level is set by potentiometer 207. The system is adjusted whereby the batteries will power the bulbs 51 for 90 minutes in accordance with regulations. Prior to this time, if the AC power comes back on, transistor Q1 turns off. This de-energizes relay coil 167 and allows switch 165 to return to engage terminal 163A to apply AC to the bulbs. LED 209 indicates if the batteries are being charged. The switch 175 is normally closed as indicated above. When it is pressed, it opens. Testing of the system is carried out by pressing the switch 175. This interrupts the AC voltage and allows the DC voltage to be applied to the bulbs. Thus if the switch 175 is pressed, the bulbs 51 will turn off and then on indicating that the system is working properly.

The circuitry of FIG. 12 including the transformer 151, the two batteries 181 and the other components are mounted on one side of a plate 221 as shown in FIGS. 2 and 3. The transformer 151, batteries 181 and other components may be disposed within a housing 231 which may be formed from 5 conventional switch boxes 235 (see FIG. 13 for a conventional switch box) ganged together as will be presently described. Each of the switch boxes 235 is about 3 inches long, about 2 inches wide, and about 2½ inches deep. The housing 231, when made up of 5 ganged switch boxes, has a total length of about 9¼ inches, a width of about 3 inches and depth of about 2½ inches. The housing 231 will usually be installed in the ceiling of a hall or room of a building, etc., such that its lower end 237 is flush with the ceiling. The plate 221 is secured to the housing 231 by way of screws 233 which extend through apertures in the plate 221 and into threaded apertures in tabs 234 of housing 231. After the plate 221 has been secured to the housing 231, the outer edges of the transverse walls 125 of the frame halves 27 and 29 are secured to the plate 221 by way of screws 223 which extend through apertures 224 formed through edge walls 132 of the frame halves and are threaded into apertures 225 formed through transverse wall portions 221A of the plate 221.

Figure 13:
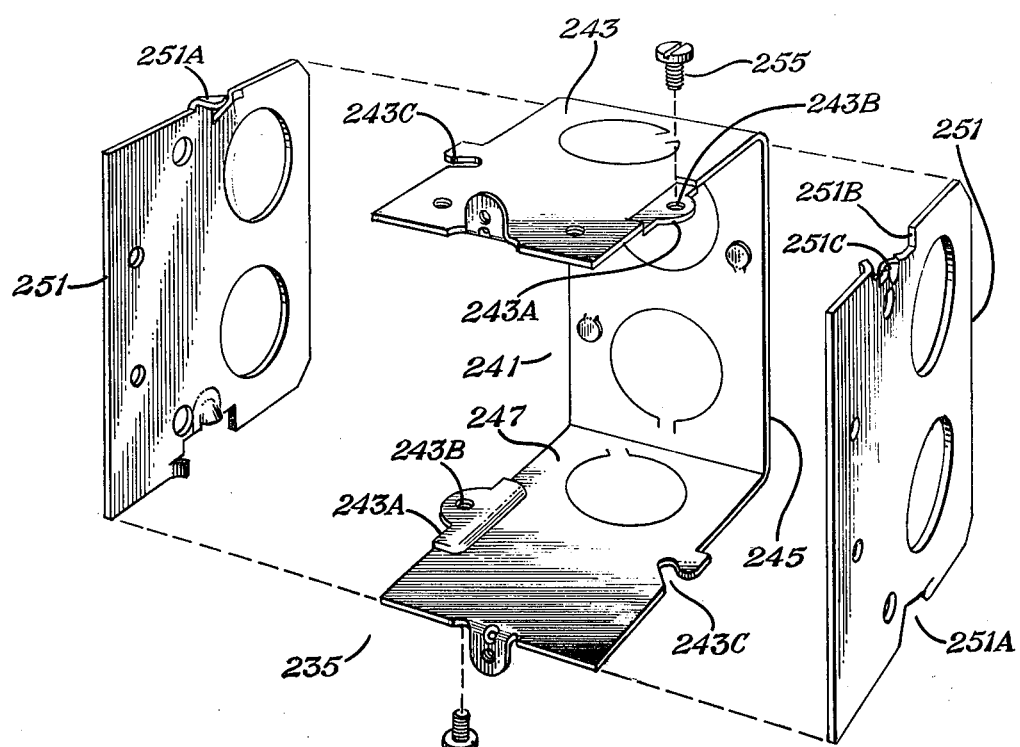
FIG. 13 is an exploded view of a conventional switch box.
Figure 14:
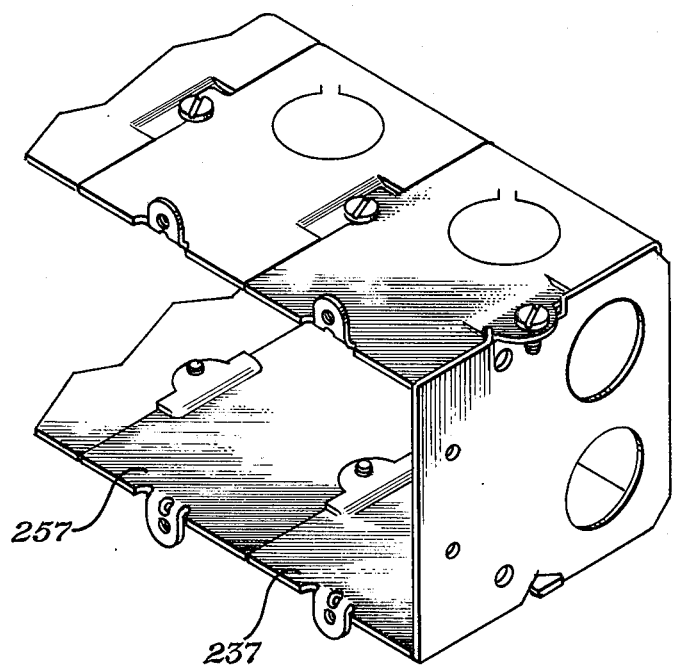
FIG. 14 is a partial perspective view of the housing of FIGS. 2 and 3.

Referring to FIGS. 13 and 14 there is illustrated a conventional electrical switch box 235. It comprises a U-shaped member 241 having a top wall 243, a rear wall 245, and a bottom wall 247. The top wall 243 has a tab 243A with a threaded aperture 243B on one side and a round slot 243C on the other side. The bottom wall 247 has the same structure but reversed in position from that of the top wall. Identical side walls 251 are attached to opposite sides of the U-shaped member 241 to form the switch box having an opening at the front end. Each side 251 comprises a bent tab 251A at one end and a cut out portion 251B at the other end. The tab 215A and the cut out portion 251B readily allow a side wall to be attached to opposite sides of the U-shaped member 241 to form the switch box. For example as shown in FIG. 13, the side wall 251 on the right is attached to the side of the U-shaped member by inserting the tab 251A into the slot 243C and threading a bolt 255 into the aperture 243B of the tab 243A such that the threaded end of the bolt extends on the outer side of the wall in slot 251C securing the wall to the U-shaped member. Five of the switch boxes may be ganged together to form the housing 231 by removing a side wall 251 from one side of a box, by removing both side walls from 3 boxes and by removing a side wall from a fifth box and attaching the five boxes together with bolts 255 as shown in FIGS. 2 and 14. Totally ten bolts will be employed for attaching the members together to form the housing 231. The lower opening of the housing is shown at 257 in FIG. 14.

Thus as can be understood since conventional electrical switch boxes can be employed to form the housing 231, the cost is reduced. Moreover, when a building is built, housings 231 can be installed in the ceiling when the other electrical outlets are installed. The exit light 21 including the frame, the lens, and the circuitry can then be secured to the housing subsequently, resulting in a reduction of labor cost. In addition, since the housing 231 can be installed in the ceiling with its lower end 237 flush with the ceiling the exit sign will have a more attractive appearance than prior exit signs which require large housings to house the circuitry and which are located below the ceiling in view of persons in the building.

Figure 15:
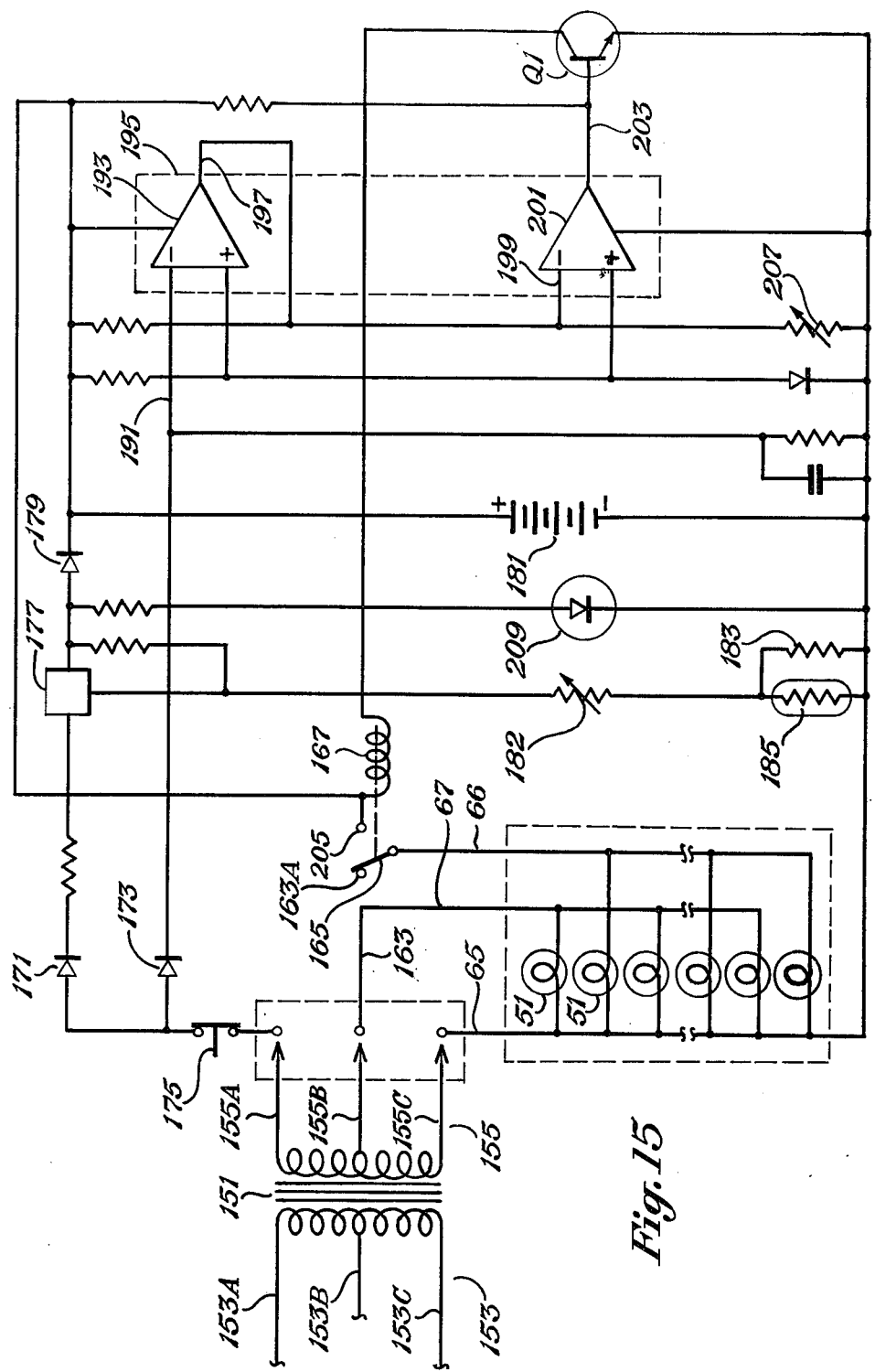
FIG. 15 is a modification of the circuit of FIG. 12 wherein one set of bulbs is used for normal lighting purposes and another set of bulbs is used for emergency purposes.

Referring now to FIG. 15, there will be described a modification wherein one set of bulbs 51 is used for normal lighting purposes and another set of bulbs 51 is used for emergency purposes. This circuitry is the same as that of FIG. 12 except that lead 163 is connected directly to lead 67 and switch 165 is connected directly to lead 66. The bulbs connected to lead 67 are used for normal lighting purposes and will include bulbs 51U, 51L, and 51D. They will be powered by AC as described previously. The other set of bulbs connected to lead 66 are used for emergency purposes and will include bulbs 51U, 51L, and 51D. If the AC power fails, relay coil 167 will be actuated as described previously to move switch 165 to contact terminal 205 to apply DC from batteries 181 to the other set of bulbs. Both sets of bulbs will be connected to the circuit boards 61U and 61L as described previously in the embodiment where the other set of bulbs was used fur back up purposes.

Figure 16:
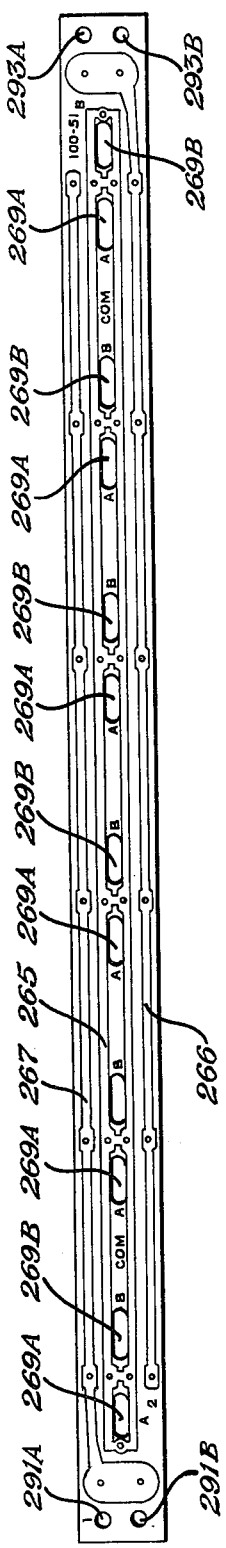
FIG. 16 illustrates another embodiment of a printed circuit board.
Figure 17:
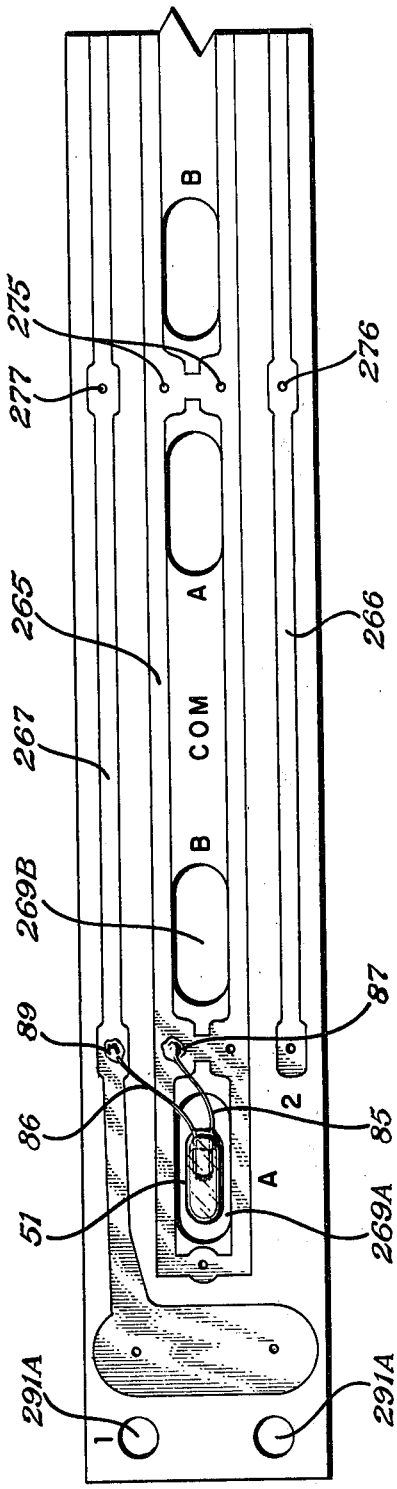
FIG. 17 is an enlarged view of a portion of the printed circuit board of FIG. 16.

Referring now to the embodiment of FIGS. 16 and 17, the circuit board 261 disclosed therein comprises a thin, flat, elongated member 263 formed of electrically non-conducting material such as fiberglass. Three flat electrical leads 265-267 are formed of metal on one side of member 263 at spaced apart positions by an etching process. Lead 265 is a common lead. It surrounds a plurality of spaced apart bulb receiving apertures 269A and 269B formed through the member 263 along its center line. A pluraliry of small lead receiving apertures 275, 276, and 277 are formed through leads 265, 266, and 267 respectfully and through member 263. Apertures 291A, 291B, 293A, 293B are formed through opposite ends of the member 263 for allowing the circuit boards 261 to be connected to the top and bottom edges 41 and 43 of the lens 23 as described in connection with boards 61. The circuit boards 261 may be used with a single lens or with two back-to-back lenses. In either case, the main bulbs 51 will be located in apertures 269A or 269B. Due to the optics of the system, when the bulbs 51 are located in the central apertures 269A or 269B, they will be able to more than satisfactorily transmit light into one or two back-to-back lenses to make the word or words EXIT stand out against a lighted white background. If the main bulbs 51 are located in apertures 269A, then the back up bulbs 51 may be located in apertures 269B. When the circuit boards 261 are used in connection with the embodiment of FIG. 15, if the bulbs 51 used for normal lighting purposes are located in apertures 269A, the bulbs 51 used for emergency purposes will be located in apertures 269B. If one set of bulbs 51 are located in apertures 269, their leads 85 and 86 will be inserted through apertures 275 and 277 and soldered at 87 and 89 to leads 265 and 267 as shown in FIG. 17. If the other set of bulbs are located in apertures 269B, their leads will be inserted through apertures 275 and 276 and soldered to leads 265 and 266.

An upper circuit board 261 will be mounted to the upper edge 41 of a lens or to the upper edges 41 of two back-to-back lenses and a lower circuit board 261 will be mounted to the lower edge 43 of a lens or to the lower edges 43 of two back-to-back lenses. The six bulbs of the upper circuit board 261 and the six bulbs of the lower circuit board 261 will transmit light into the lens or lenses for making the word or words EXIT stand out against a lighted white background. The six bulbs of the lower circuit board 261 also will project light downward through lens 145 for downlighting purposes.

The use of circuit board 261 has advantages over circuit board 61 since two of the boards 261, mounted to the upper and lower edges 41 and 43 of a lens with 12 bulbs mounted in their apertures 269A or 269B (6 bulbs for each circuit board) will provide more light for transmission into the lens and more light for downlighting purposes than will the 12 bulbs mounted to circuit boards 61 as shown in FIG. 6. Moreover, since the apertures 269A and 269B are precut in the board members 263, all of the circuit boards 261 will have their bulbs 51 located in the same relative positions. The dimensions of circuit board 261 are the same as that of circuit board 61.

In another embodiment, the lens 23 with its circuit boards 61 or 261 and miniature incandescent light bulbs 51 may be employed as a lighted exit sign which fits flush up against the wall. In this embodiment, the frame halves employed will not have the transverse portions 125 and the circuitry of FIG. 12 or 15 including the transformer 151, the batteries 181 and other components will be located in the housing 231 which will be separated from the frame of the exit light. In this embodiment, the downlighting bulbs 51D of circuit board 61 will not be employed. In this embodiment, the circuit boards 61 or 261 and their bulbs 51 may be mounted to the sides 42 and 43 of the lens 23 or to the upper and lower edges 41 and 43 thereof.

Although the lens 145 and the miniature incandescent light bulbs 51 were described as being used for downlighting purposes in the panel 21, it is to be understood that the lens 145 and bulbs 51 may be used separate and apart from the panel 21 for low level and emergency downlighting illumination of hallways, walkways, stairs, etc. In this embodiment, the lens 145 and the circuit board 61L and bulbs 51D or the lens 145 and one circuit board 261 and its bulbs 51 may be mounted to a suitable frame and the circuitry of FIG. 12 or 15 employed for energizing the bulbs during normal and emergency conditions for downlighting purposes.

I claim:

1. A panel to be illuminated comprising:
a light transmitting plate having a viewing side and an edge onto which light can be projected for transmission into said plate for viewing from said viewing side,
a plurality of sub-miniature incandescent light bulbs located close to said edge of said plate along its length at spaced apart positions for producing light when energized for projection onto said edge of said plate for transmission into said plate for viewing from said viewing side,
each of said bulbs being rated at a given voltage level,
power means for normally applying an operating voltage to said plurality of sub-miniature incandescent light bulbs at a voltage level significantly less than said given voltage level for normally energizing said bulbs at said operating voltage level significantly less than said given voltage level thereby increasing the lifetime of said bulbs over that obtainable if said bulbs were normally energized at said given voltage level,
emergency power means for applying an emergency voltage to said plurality of sub-miniature incandescent light bulbs in the event that said operating voltage fails,
said emergency voltage being at a level significantly greater than said given voltage level thereby increasing the brightness of said bulbs in the event of an emergency.

2. The panel of claim 1 comprising:
a thin elongated circuit board located close to and extending along said edge of said plate,
said thin elongated circuit board comprising a thin elongated electrically non-conducting member having at least two generally flat electrical leads secured to said thin elongated member at spaced apart positions along its length on one side thereof with a plurality of spaced apart apertures formed through each of said leads and through said thin elongated member,
said plurality of sub-miniature incandescent light bulbs each having two electrical leads extending therefrom,
the two leads of each of said bulbs extending through two apertures formed through said two generally flat leads respectively and electrically secured to said two generally flat leads.

3. The panel of claims 1 or 2 wherein:
said operating voltage is an AC voltage,
said emergency voltage is a DC voltage.

4. The panel of claim 2, wherein:
said thin elongated electrically non-conducting member has a plurality of bulb receiving apertures formed therethrough at spaced apart positions along its length,
said plurality of sub-miniature incandescent light bulbs being located in said plurality of spaced apart bulb receiving apertures.

5. The panel of claims 1 or 2, comprising:
a light reflecting layer formed on the side of said plate opposite said viewing side.

6. A panel to be illuminated, comprising:
a light transmitting plate having a viewing side and an edge onto which light can be projected for transmission into said plate for viewing from said viewing side,
a thin elongated circuit board located close to and extending along said edge of said plate,
said thin elongated circuit board comprising a thin elongated electrically non-conducting member having at least two generally flat electrical leads secured to said thin elongated member at spaced apart positions along its length on one side thereof with a plurality of spaced apart apertures formed through each of said leads and through said thin elongated member,
a plurality of sub-miniature incandescent light bulbs each having two electrical leads extending therefrom,
the two leads of each of said bulbs extending through two apertures formed through said two generally flat leads respectively and electrically secured to said two generally flat leads,
said plurality of bulbs producing light when energized for projection onto said edge of said plate for transmission into said plate for viewing from said viewing side.

7. The panel of claim 6, wherein:

said thin elongated electrically non-conducting member has a plurality of bulb receiving apertures formed therethrough at spaced apart positions along its length, said plurality of sub-miniature incandescent light bulbs being located in said plurality of spaced apart bulb receiving apertures.

8. A panel to be illuminated, comprising:

a light transmitting plate having a viewing side and upper and lower edges onto which light can be projected for transmission into said plate for viewing from said viewing side, means for mounting said plate to structure such that said upper edge faces upward and said lower edge faces downward, a thin elongated upper circuit board located close to and extending along said upper edge of said plate, said thin elongated upper circuit board comprising a thin elongated electrically non-conducting upper member having at least two generally flat upper leads secured to said thin elongated upper member at spaced apart positions along its length on one side thereof with a plurality of apertures formed through each of said upper leads and through said thin elongated upper member, a plurality of sub-miniature incandescent upper light bulbs, each having two electrical leads extending therefrom, the two leads of each of said upper bulbs extending through two apertures formed through said two generally flat upper leads respectively and electrically secured to said two generally flat upper leads, said plurality of upper bulbs producing light when energized for projection onto said upper edge of said plate for transmission into said plate for viewing from said viewing side, a thin elongated lower circuit board located close to and extending along said lower edge of said plate, said thin elongated lower circuit board comprising a thin elongated electrically non-conductive lower member having at least two generally flat lower electrical leads secured to said thin elongated lower member at spaced apart positions along its length on one side thereof with a plurality of apertures formed through each of said lower leads and through said thin elongated lower member, a plurality of small incandescent lower light bulbs, each having two leads extending therefrom, the two leads of each of said lower bulbs extending through two apertures formed through said two generally flat lower leads respectively and electrically secured to said two generally flat lower leads, said plurality of lower bulbs producing light when energized for projection on said lower edge of said plate for transmission into said plate for viewing from said viewing side.

9. The panel of claim 8 wherein:

said upper and lower circuit boards are identical to each other.

10. The panel of claim 8, comprising:

a plurality of sub-miniature incandescent down lighting bulbs, each having two electrical leads extending therefrom, said two leads of each of said down lighting bulbs extending through two apertures formed through said two generally flat lower leads respectively and electrically secured to said two generally flat lower leads, said plurality of down lighting bulbs being located on the lower side of said thin elongated lower member for producing light when energized for projection downward.

11. A panel to be illuminated, comprising:

a light transmitting plate having a viewing side and a lower edge onto which light can be projected for transmission into said plate for viewing from said viewing side, means for mounting said plate to structure such that said lower edge faces downward, an elongated thin circuit board located close to and extending along said lower edge of said plate, said elongated circuit board comprising a thin elongated electrically non-conducting member having at least two generally flat electrical leads secured to said thin elongated member at spaced apart positions along its length on one side thereof with a plurality of apertures formed through each of said leads and through said thin elongated member, a plurality of sub-miniature incandescent light bulbs, each having two electrical leads extending therefrom, the two leads of each of said bulbs extending through two apertures formed through said two generally flat leads respectively and electrically secured to said two generally flat leads, said plurality of bulbs producing light when energized for projection onto said lower edge of said plate for transmission into said plate for viewing from said viewing side and for projection downward.

12. A panel to be illuminated, comprising:

two light transmitting plates each having a viewing side and an edge onto which light can be projected for transmission into said two plates for viewing from their viewing sides, a light reflecting layer located on the side of each plate opposite its viewing side, means for supporting said two plates such that said two light reflecting layers of said two plates are back to back, said viewing sides of said two plates face opposite directions, and said edges of said two plates are adjacent to each other, a thin elongated circuit board located close to and extending along said edges of said two plates, said thin elongated circuit board having a width about equal to the total widths of said two edges of said two plates, said thin elongated circuit board comprising a thin elongated electrically non-conducting member have at least two generally flat electrical leads secured to said thin elongated member at spaced apart positions along its length on one side thereof with a plurality of apertures formed through each of said leads and through said thin elongated member, a plurality of sub-miniature incandescent light bulbs, each having two electrical leads extending therefrom, the two leads of each of said bulbs extending through two apertures formed through said two generally flat electrical leads respectively and electrically secured to said two generally flat electrical leads, said plurality of bulbs producing light when energized for projection onto said two edges of said two plates for transmission into said two plates for viewing from said viewing sides.

13. A panel to be illuminated, comprising:
a light transmitting plate having a viewing side and an edge onto which light can be projected for transmission onto said plate for viewing from said viewing side,
a thin elongated circuit board located close to and extending along said edge of said plate,
said thin elongated circuit board comprising a thin elongated electrically non-conducting member having three generally flat electrical leads secured to said thin elongated member at spaced apart positions along its length on one side thereof with a plurality of apertures formed through each of said leads and through said thin elongated member,
one of said three leads being defined as a common lead,
a first set of sub-miniature incandescent light bulbs, each having two electrical leads extending therefrom,
the two leads of each of said first set of bulbs extending through two apertures formed through said common lead and through a first of said other two generally flat electrical leads respectively and electrically secured to said common lead and to said first of said other two generally flat electrical leads,
a second set of sub-miniature incandescent light bulbs, each having two electrical leads extending therefrom,
the two leads of each of said second set of bulbs extending through two apertures formed through said common lead and through the second of said other two generally flat electrical leads respectively and electrically secured to said common lead and to said second of said other two generally flat electrical leads,
said first and second set of bulbs producing light when energized for projection onto said edge of said plate for transmission into said plate for viewing from said viewing side,
electrical power means normally connected to said common lead and to said first of said other two generally flat electrical leads for normally energizing said first set of bulbs, and
switch means for disconnecting said electrical power means from said first of said other two generally flat electrical leads and for connecting said electrical power means to said second of said other two generally flat electrical leads for energizing said second set of bulbs.

14. A panel to be illuminated, comprising:
two light transmitting plates each having a viewing side and an edge onto which light can be projected for transmission into said two plates for viewing from said viewing sides,
a light reflecting layer formed on each of said plates opposite its viewing side,
means for holding said two plates such that said two reflecting layers are back to back, said two viewing sides face opposite directions, and said two edges of said two plates are adjacent to each other,
a thin elongated circuit board located close to and extending along said two edges of said two plates,
said circuit board having a width about equal to the total widths of said two edges of said two plates,
said thin elongated circuit board comprising a thin elongated electrically non-conductive member having three generally flat electrical leads secured to said thin elongated member at spaced apart positions along its length on one side thereof with a plurality of apertures formed through each of said leads and through said thin elongated member,
one of said three leads being defined as a common lead,
a first set of sub-miniature incandescent light bulbs, each having two electrical leads extending therefrom,
the two leads of each of said first set of bulbs extending through two apertures formed through said common lead and through a first of said other two generally flat electrical leads respectively and electrically secured to said common lead and to said first of said other two generally flat electrical leads,
a second set of sub-miniature incandescent light bulbs, each having two electrical leads extending therefrom,
the two leads of each of said second set of bulbs extending through two apertures formed through said common lead and through the second of said other two generally flat electrical leads respectively and electrically secured to said common lead and to said second of said other two generally flat electrical leads,
said plurality of bulbs producing light when energized for projection onto said two edges of said two plates for transmission into said two plates for viewing from said viewing sides,
electrical power means normally connected to said common lead and to said first of said other two generally flat electrical leads for normally energizing said first set of bulbs, and
switch means for disconnecting said electrical power means from said first of said other two generally flat electrical leads and for connecting said electrical power means to said second of said other two generally flat electrical leads for energizing said second set of bulbs.

15. The panel of claims 6, 7, 8, 9, 10, 11, or 13 wherein:
each of said bulbs is rated at a given voltage level,
power means for normally applying an operating voltage to said plurality of sub-miniature incandescent light bulbs at a voltage level significantly less than said given voltage level for normally energizing said bulbs at said operating voltage level less than said given voltage level thereby increasing the lifetime of said bulbs over that obtainable if said bulbs were normally energized at said given voltage level,
emergency power means for applying an emergency voltage to said plurality of sub-miniature incandescent light bulbs in the event that said operating voltage fails,
said emergency voltage being at a level significantly greater than said given voltage level thereby increasing the brightness of said bulbs in the event of an emergency.

16. The panel of claims 6, 7, 8, 9, 10, 11, or 13 comprising:
a light reflecting layer located on the side of said plate opposite said viewing side.

17. A panel to be illuminated comprising:

a light transmitting plate having a viewing side and an edge onto which light can be projected for transmission into said plate for viewing from said viewing side, a plurality of sub-miniature incandescent light bulbs located close to said edge of said plate along its length at spaced apart positions for producing light when energized for projection onto said edge of said plate for transmission into said plate for viewing from said viewing side, each of said bulbs being rated at a given voltage level, transformer means for converting a main power AC voltage to a first reduced AC voltage at a level significantly less than said given voltage level, first circuit means for normally applying said first reduced voltage to said bulbs for energizing said bulbs, said transformer means converting said main power AC voltage to a second reduced AC voltage at a level above said given voltage level significantly, means for rectifying said second reduced AC voltage, battery means for producing a DC voltage at a level above said given voltage level, second circuit means for applying said rectified voltage to said battery means for maintaining said battery means charged, and switch means for disconnecting said first reduced AC voltage from said bulbs and for connecting said battery means to said bulbs in the event that said main power AC voltage fails, to energize said bulbs with said DC voltage.

18. The panel of claim 17, wherein:

said transformer means, said battery means, said first and second circuit means and said switch means are packaged to fit in a housing formed by five ganged conventional switch boxes.

19. A panel to be illuminated comprising:

a light transmitting plate having viewing side and an edge onto which light can be projected for transmission into said plate for viewing from said viewing side, a plurality of sub-miniature incandescent primary light bulbs located close to said edge of said plate along its length at spaced apart positions for producing light when energized for projection onto said edge of said plate for transmission into said plate for viewing from said viewing side, each of said primary light bulbs being rated at a given voltage level, a plurality of sub-miniature incandescent emergency light bulbs located close to said edge of said plate along its length at spaced apart positions for producing light when energized for projection onto said edge of said plate for transmission into said plate for viewing from said viewing side, each of said emergency light bulbs being rated at a given voltage level, power means for normally applying an operating voltage to said plurality of sub-miniature incandescent primary light bulbs at a voltage level significantly less than their rated voltage for normally energizing said primary light bulbs at said operating voltage level significantly less than their rated voltage thereby increasing the lifetime of said primary light bulbs over that obtainable if said primary light bulbs were normally energized at their rated voltage, emergency power means for applying an emergency voltage to said plurality of sub-miniature incandescent emergency light bulbs in the event that said operating voltage fails, said emergency voltage being at a level significantly greater than said rated voltage of said emergency light bulbs thereby increasing the brightness of said emergency light bulbs in the event of an emergency.

20. The panel of claim 19 comprising:

a thin elongated thin circuit board located close to and extending along said edge of said plate, said thin elongated circuit board comprising a thin elongated electrically non-conducting member having at least two generally flat electrical leads secured to said thin elongated member at spaced apart positions along its length on one side thereof with a plurality of spaced apart apertures formed through each of said leads and through said thin elongated member, said plurality of sub-miniature incandescent primary and emergency light bulbs each having two electrical leads extending therefrom, the two leads of each of said bulbs extending through two apertures formed through said two generally flat leads respectively and electrically secured to said two generally flat leads.

21. The panel of claims 19 or 20 wherein:

said operating voltage is an AC voltage, said emergency voltage is a DC voltage.

22. The panel of claim 20, wherein:

said thin elongated electrically non-conducting member has a plurality of bulb receiving apertures formed therethrough at spaced apart positions along its length, said plurality of sub-miniature incandescent light bulbs being located in said plurality of spaced apart bulb receiving apertures.

23. The panel of claims 19 or 20 comprising:

a light reflecting layer formed on the side of said plate opposite said viewing side.

24. A panel to be illuminated, comprising:

a light transmitting plate having a viewing side and an edge onto which light can be projected for transmission into said plate for viewing from said viewing side, a plurality of sub-miniature incandescent primary light bulbs located close to said edge of said plate and along its length at apaced apart positions for producing light when energized for projection onto said edge of said plate for transmission into said plate for viewing from said viewing side, a plurality of sub-miniature incandescent emergency light bulbs located close to said edge of said plate and along its length at spaced apart positions for producing light when energized for projection onto said edge of said plate for transmission into said plate for viewing from said viewing side, power means for normally applying an operating voltage to said plurality of sub-miniature incandescent primary light bulbs at a normal operating voltage level for normally energizing said primary light bulbs, and emergency power means for applying an emergency voltage to said plurality of sub-miniature incandescent emergency light bulbs in the event that said operating voltage fails, said emergency voltage being at a level sufficient to energize said emergency light bulbs to a brightness greater than the brightness significantly of said primary light bulbs produced when said primary light bulbs are energized by said operating voltage.

25. A panel to be illuminated comprising:

a light transmitting plate having a viewing side and an edge onto which light can be projected for transmission into said plate for viewing from said viewing side, a plurality of sub-miniature incandescent primary light bulbs located close to said edge of said plate along its length at spaced apart positions for producing light when energized for projection onto said edge of said plate for transmission into said plate for viewing from said viewing side, each of said primary light bulbs being rated at a given voltage level, a plurality of sub-miniature incandescent emergency light bulbs located close to said edge of said plate along its length at spaced apart positions for producing light when energized for projection onto said edge of said plate for transmission into said plate for viewing from said viewing side, each of said emergency light bulbs being rated at a given voltage level, transformer means for converting a main power AC voltage to a first reduced AC voltage at a level significantly less than the rated voltage of said primary light bulbs, first circuit means for normally applying said first reduced voltage to said primary light bulbs for energizing said primary light bulbs, said transformer means converting said main power AC voltage to a second reduced AC voltage at a level above the rated voltage of said emergency light bulbs, means for rectifying said second reduced AC voltage, battery means for producing a DC voltage at a level significantly above the rated voltage of said emergency light bulbs, second circuit means for applying said rectified voltage to said battery means for maintaining said battery means charged, and switch means for disconnecting said first reduced AC voltage from said primary light bulbs and for connecting said battery means to said emergency light bulbs in the event that said main power AC voltage fails, to energize said emergency light bulbs with said DC voltage.

26. The panel of claim 25, wherein:

said transformer means, said battery means, said first and second circuit means and said switch means are packaged to fit in a housing formed by five ganged conventional switch boxes.

27. A panel to be illuminated, comprising:

a light transmitting plate having a viewing side and an edge onto which light can be projected for transmission into said plate for viewing from said viewing side, a thin elongated circuit board located close to and extending along said edge of said plate, said thin elongated circuit board comprising a thin elongated electrically non-conducting member having a plurality of bulb receiving apertures formed therethrough at spaced apart positions along its length and at least two generally flat electrical leads secured to said thin elongated member at spaced apart positions along its length on one side thereof with a plurality of spaced apart lead receiving apertures formed through each of said leads and through said thin elongated member, a plurality of sub-miniature incandescent light bulbs each having two electrical leads extending therefrom, the two leads of each of said bulbs extending through two lead receiving apertures formed through said two generally flat leads respectively and electrically secured to said two generally flat leads, said plurality of bulbs being located in said bulb receiving apertures for producing light when energized for projection onto said edge of said plate for transmission into said plate for viewing from said viewing side.

28. A panel to be illuminated, comprising:

a light transmitting plate having a viewing side and a lower edge onto which light can be projected for transmission into said plate for viewing from said viewing side, means for mounting said plate to structure such that said lower edge faces downward, an elongated thin circuit board located close to and extending along said lower edge of said plate, said elongated circuit board comprising a thin elongated electrically non-conducting member having a plurality of bulb receiving apertures formed therethrough at spaced apart positions along its length and at least two generally flat electrical leads secured to said thin elongated member at spaced apart positions along its length on one side thereof with a plurality of lead receiving apertures formed through each of said leads and through said thin elongated member, a plurality of sub-miniature incandescent light bulbs, each having two electrical leads extending therefrom, the two leads of each of said bulbs extending through two lead receiving apertures formed through said two generally flat leads respectively and electrically secured to said two generally flat leads, said plurality of bulbs being located in said bulb receiving apertures for producing light when energized for projection onto said lower edge of said plate for transmission into said plate for viewing from said viewing side and for projection downward.

29. A lighting device, comprising:

a light transmitting lens, a plurality of sub-miniature incandescent light bulbs located close to an edge of said lens at spaced apart positions for producing light when energized for projection into said lens, each of said bulbs being rated at a given voltage level, power means for normally applying an operating voltage to said plurality of sub-miniature incandescent light bulbs at a voltage level significantly less than said given voltage level for normally energizing said bulbs at said operating voltage level significantly less than said given voltage level thereby increasing the lifetime of said bulbs over that obtainable if said bulbs were normally energized at said given voltage level, emergency power means for applying an emergency voltage to said plurality of sub-miniature incandescent light bulbs in the event that said operating voltage fails, said emergency voltage being at a level significantly greater than said given voltage level thereby increasing the brightness of said bulbs in the event of an emergency.

30. The lighting device of claim 29, comprising:

a thin elongated circuit board located close to an edge of said lens, said thin elongated circuit board comprising a thin elongated electrically non-conducting member having at least two generally flat electrical leads secured to said thin elongated member at spaced apart positions along its length on one side thereof with a plurality of spaced apart apertures formed through each of said leads and through said thin elongated member, said plurality of sub-miniature incandescent light bulbs each having two electrical leads extending therefrom, the two leads of each of said bulbs extending through two apertures formed through said two generally flat leads respectively and electrically secured to said two generally flat leads.

31. The panel of claims 30, wherein:

said thin elongated electrically non-conducting member has a plurality of bulb receiving apertures formed therethrough at spaced apart positions along its length, said plurality of sub-miniature incandescent light bulbs being located in said plurality of spaced apart bulb receiving apertures.

32. A lighting device, comprising:

a light transmitting lens, a plurality of sub-miniature incandescent light bulbs located close to an edge of said lens at spaced apart positions for producing light when energized for projection into said lens, each of said bulbs being rated at a given voltage level, transformer means for converting a main power AC voltage to a first reduced AC voltage at a level significantly less than said given voltage level, first circuit means for normally applying said first reduced voltage to said bulbs for energizing said bulbs, said transformer means converting said main power AC voltage to a second reduced AC voltage at a level significantly above said given voltage level, means for rectifying said second reduced AC voltage, battery means for producing a DC voltage at a level significantly above said given voltage level, second circuit means for applying said rectified voltage to said battery means for maintaining said battery means charged, and switch means for disconnecting said first reduced AC voltage from said bulbs and for connecting said battery means to said bulbs in the event that said main power AC voltage fails, to energize said bulbs with said DC voltage.

33. A lighting device, comprising:

a light transmitting lens, a plurality of sub-miniature incandescent primary light bulbs located close to an edge of said lens at spaced apart positions for producing light when energized for projection into said lens, each of said primary light bulbs being rated at a given voltage level, a plurality of sub-miniature incandescent emergency light bulbs located close to said lens along its length at space apart positions for producing light when energized for projection into said lens, each of said emergency light bulbs being rated at a given voltage level, power means for normally applying an operating voltage to said plurality of sub-miniature incandescent primary light bulbs at a voltage level significantly less than their rated voltage for normally energizing said primary light bulbs at said operating voltage level significantly less than their rated voltage thereby increasing the lifetime of said primary light bulbs over that obtainable if said primary light bulbs were normally energized at their rated voltage, emergency power means for applying an emergency voltage to said plurality of sub-miniature incandescent emergency light bulbs in the event that said operating voltage fails, said emergency voltage being at a level significantly greater than said rated voltage of said emergency light bulbs thereby increasing the brightness of said emergency light bulbs in the event of an emergency.

34. The lighting device of claim 33, comprising:

a thin elongated thin circuit board located close to an edge of said lens, said thin elongated circuit board comprising a thin elongated electrically non-conducting member having at least two generally flat electrical leads secured to said thin elongated member at spaced apart positions along its length on one side thereof with a plurality of spaced apart apertures formed through each of said leads and through said thin elongated member, said plurality of sub-miniature incandescent primary and emergency light bulbs each having two electrical leads extending therefrom, the two leads of each of said bulbs extending through two apertures formed through said two generally flat leads respectively and electrically secured to said two generally flat leads.

35. The lighting device of claim 34, wherein:

said thin elongated electrically non-conducting member has a plurality of bulb receiving apertures formed therethrough at spaced apart positions along its length, said plurality of sub-miniature incandescent light bulbs being located in said plurality of spaced apart bulb receiving apertures.

36. A lighting device, comprising:

a light transmitting lens, a plurality of sub-miniature incandescent primary light bulbs located close to an edge of said lens at spaced apart positions for producing light when energized for projection into said lens, a plurality of sub-miniature incandescent emergency light bulbs located close to an edge of said lens at spaced apart positions for producing light when energized for projection into said lens, power means for normally applying an operating voltage to said plurality of sub-miniature incandescent primary light bulbs at a normal operating voltage level for normally energizing said primary light bulbs, and emergency power means for applying an emergency voltage to said plurality of sub-miniature incandescent emergency light bulbs in the event that said operating voltage fails, said emergency voltage being at a level sufficient to energize said emergency light bulbs to a brightness significantly greater than the brightness of said primary light bulbs produced when said primary light bulbs are energized by said operating voltage.

37. A lighting device comprising:

a light transmitting lens, a plurality of sub-miniature incandescent primary light bulbs located close to an edge of said lens at spaced apart positions for producing light when energized for projection into said lens, each of said primary light bulbs being rated at a given voltage level, a plurality of sub-miniature incandescent emergency light bulbs located close to an edge of said lens at spaced apart positions for producing light when energized for projection into said lens, each of said emergency light bulbs being rated at a given voltage level, transformer means for converting a main power AC voltage to a first reduced AC voltage at a level significantly less than the rated voltage of said primary light bulbs, first circuit means for normally applying said first reduced voltage to said primary light bulbs for energizing said primary light bulbs, said transformer means converting said main power AC voltage to a second reduced AC voltage to a level significantly above the rated voltage of said emergency light bulbs, means for rectifying said second reduced AC voltage, battery means for producing a DC voltage at a level significantly above the rated voltage of said emergency light bulbs, second circuit means for applying said rectified voltage to said battery means for maintaining said battery means charged, and switch means for disconnecting said first reduced AC voltage from said primary light bulbs and for connecting said battery means to said emergency light bulbs in the event that said main power AC voltage fails, to energize said emergency light bulbs with said DC voltage.

38. A lighting device, comprising:

a light transmitting lens, a thin elongated circuit board located close to said lens, said thin elongated circuit board comprising a thin elongated electrically non-conducting member having a plurality of bulb receiving apertures formed therethrough at spaced apart positions along its length and at least two generally flat electrical leads secured to said thin elongated member at spaced apart positions along its length on one side thereof with a plurality of spaced apart lead receiving apertures formed through each of said leads and through said thin elongated member, a plurality of sub-miniature incandescent light bulbs each having two electrical leads extending therefrom, the two leads of each of said bulbs extending through two lead receiving apertures formed through said two generally flat leads respectively and electrically secured to said two generally flat leads, said plurality of bulbs being located in said bulb receiving apertures for producing light when energized for projection into said lens.

39. A panel to illuminated comprising:

a frame containing a light transmitting plate having a viewing side and an edge onto which light can be projected for transmission into said plate for viewing from said viewing side, and a plurality of sub-miniature incandescent light bulbs located close to said edge of said plate along its length for producing light when energized for projection onto said edge of said plate for transmission into said plate for viewing from said viewing side, transformer means, battery means and circuitry for operating said panel mounted on one side of a base plate, a housing made up of a plurality of conventional ganged switch boxes, means for removably securing said base plate to said housing such that said transformer means, battery means and circuitry is received within said housing, and means for removably securing said frame to the other side of said base plate.

* * * * *